United States Patent [19]

Reppel

[11] 3,779,833

[45] Dec. 18, 1973

[54] APPARATUS FOR RETREADING TIRES

[75] Inventor: Willi E. Reppel, Lewiston, Maine

[73] Assignee: Oliver Tire and Rubber Company, Oakland, Calif.

[22] Filed: Apr. 25, 1972

[21] Appl. No.: 247,488

Related U.S. Application Data

[63] Continuation of Ser. No. 883,161, Dec. 8, 1969, abandoned.

[52] U.S. Cl. .................... 156/394, 156/96, 264/36, 264/315, 264/316, 425/19, 425/39, 425/43, 425/45
[51] Int. Cl. ..................... B29h 5/04, B29h 5/18
[58] Field of Search ............... 156/96, 394; 264/36, 264/313, 314, 315, 316; 425/DIG. 19, 39, 43, 44, 45

[56] References Cited
UNITED STATES PATENTS

| | | | |
|---|---|---|---|
| 2,014,010 | 9/1935 | Wheatley | 156/394 FM |
| 2,459,757 | 1/1949 | Smith | 156/96 X |
| 3,207,647 | 9/1965 | Schelkmann | 156/394 X |
| 2,904,842 | 9/1959 | Alm | 156/394 X |
| 3,486,198 | 12/1969 | Lewis | 425/43 X |
| 2,501,577 | 3/1950 | Pfeiffer | 156/394 X |
| 2,746,515 | 5/1956 | Usack | 156/116 |
| 2,774,409 | 12/1956 | Skidmore | 156/96 |

*Primary Examiner*—Alfred L. Leavitt
*Assistant Examiner*—C. B. Cosby
*Attorney*—William D. Hall et al.

[57] ABSTRACT

The specification discloses an apparatus for retreading a tire casing with a precured and premolded tire tread. The apparatus includes a flexible envelope which surrounds the tire and precured tread assembly from sidewall to sidewall to form with the walls of a multipart chamber device a fluid tight annular chamber surrounding the tread portion of the assembly. The apparatus includes means for inflating the interior of the assembly to laterally distend the sidewalls of the casing into engagement with sealing means mounted on the inner walls of the multipart chamber device.

16 Claims, 10 Drawing Figures

INVENTOR
WILLI E. REPPEL

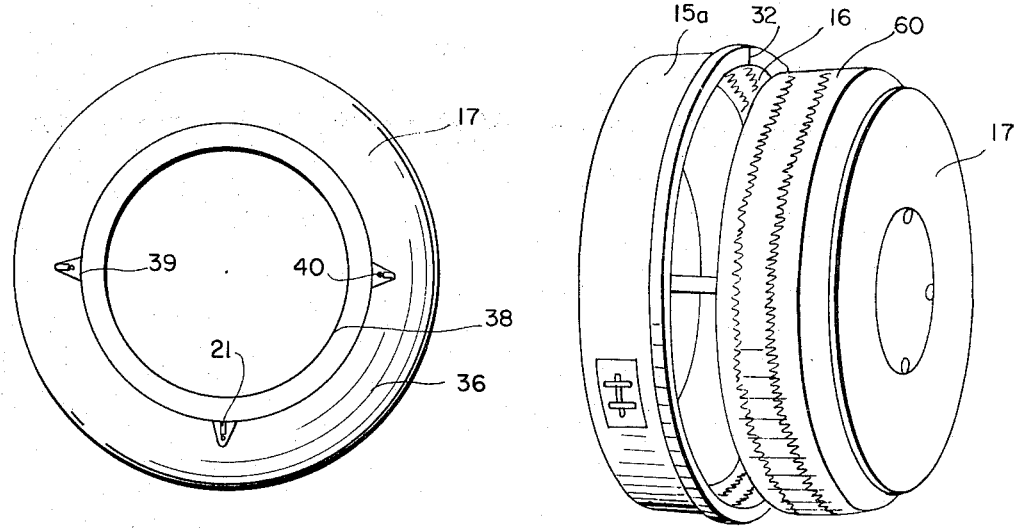
FIG. 3  FIG. 4
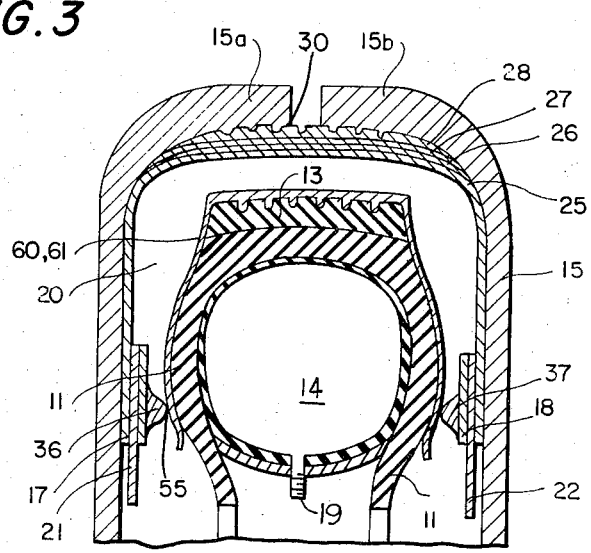
FIG. 5
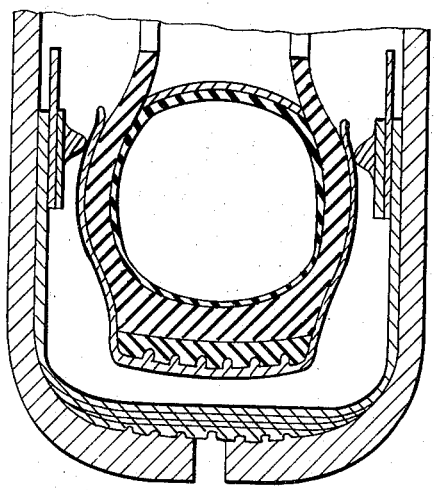
INVENTOR
WILLI E. REPPEL

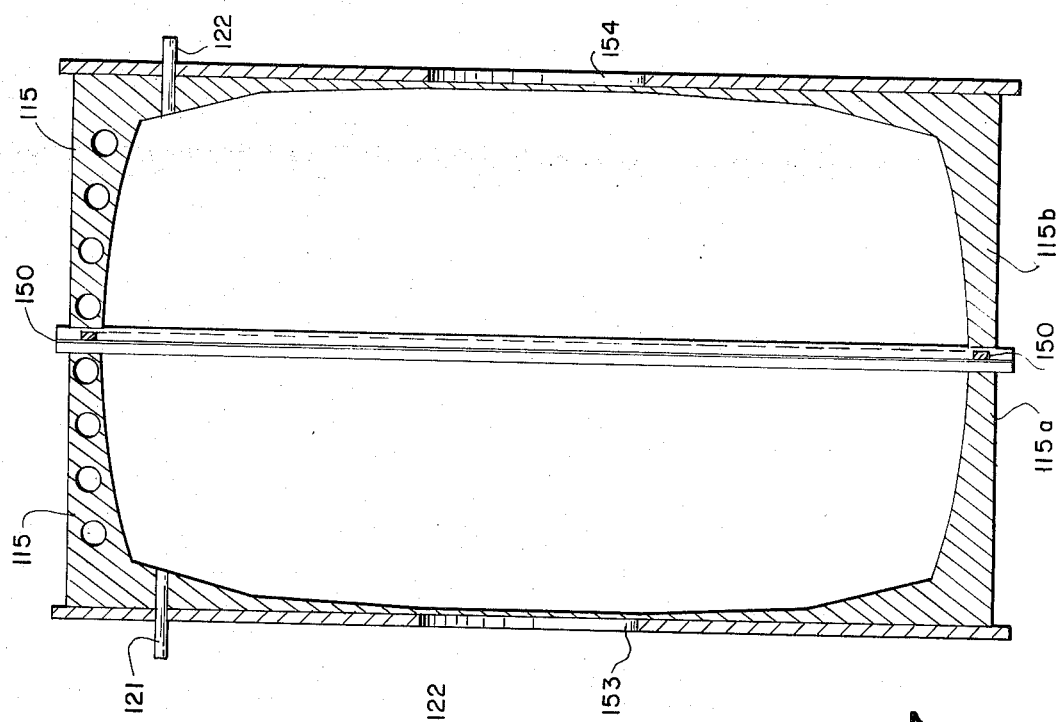
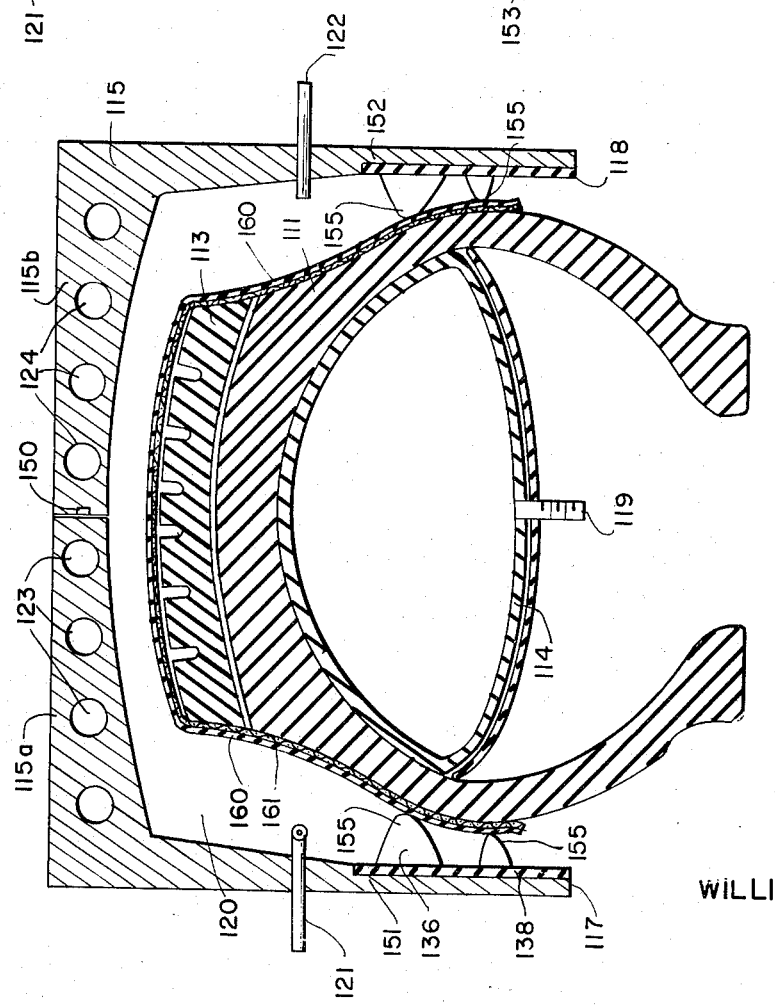
FIG. 7
FIG. 6
INVENTOR
WILLI E. REPPEL 3,779,833

APPARATUS FOR RETREADING TIRES

This is a continuation of application, Ser. No. 883,161, filed Dec. 8, 1969, now abandoned. This continuation application is copending with U.S. Ser. No. 182,602; U.S. Ser. No. 182,603; and U.S. Ser. No. 182,814, all of which were divisional applications of the parent U.S. application U.S. Ser. No. 883,161.

BRIEF SUMMARY OF THE INVENTION

Generally speaking, there are two methods of retreading a worn-out tire to make it suitable for continued use. They are retreading a tire in a standard retreading mold, and moldless retreading.

Tires to be retreaded in molds are buffed and covered with a layer of uncured rubber, and placed into a standard tire retreading mold. In the mold, the rubber is shaped into the desired tread pattern by pressurizing the inside of the tire and heating the entire assembly until the uncured rubber is cured, formed and bonded to the old casing by a combination of heat and pressure.

The problem with retreading a tire in a standard retreading mold resides in the fact that the finished tread will quickly wear in use. This is because the layer of uncured rubber cannot be subjected to extremely high molding pressures and temperatures while being vulcanized without permanently deforming or distorting the casing. Any deformation or distortion during the curing operation will subsequently tend to rupture or weaken the vulcanized bond between the cured and molded tire tread and the carcass itself. Any excessive temperature also tends to weaken and deteriorate the tire carcass which was previously cured.

Moldless retreading, on the other hand, uses a strip of precured and premolded tread which is usually supplied in a long, continuous strip from an extrusion and molding process. This precured and preformed strip of tread material is, in a sense, vulcanized before it is applied to the tire casing, as considerably higher vulcanization pressures and temperatures may be applied while the strip is being molded without the tire carcass. This results in a tread surface which will have improved strength and density and which will resist normal road abrasion.

In this method, the worn-out tire is treated by a buffing machine as in the molding operation, and the precured and premolded tread rubber is applied to the buffed casing with a layer of uncured raw rubber compound therebetween. The tire is then wrapped up in an adjustable thin steel band and inflated and the entire assembly is heated and cured in a pressurized and heated chamber.

An alternate form of moldless retreading with the tread strips that are precured and premolded utilizes a flexible rubber envelope that continuously covers the outside of the tire when the tire is mounted on a tire rim. The entire assembly is again inserted into a pressurized and heated chamber, but the envelope gives a uniform pressure to the tread and casing and assists in giving a uniform and continuous bond while assisting in the removal of any possible air bubbles.

This method of moldless retreading requires the operator to invest in expensive equipment to utilize the new premolded and precured tread.

The present invention makes it possible to utilize the precured and premolded tread that has become popular in an existing standard tire retreading mold. In addition, the invention allows retreading of various sized tires within a single size tire retreading mold. The present invention utilizes a mold liner to seal the interior of the mold and a gasket means to seal various sized tires within the mold.

BRIEF DESCRIPTION OF THE DRAWINGS

FIG. 3 is a plan view of the gasket sealing means used in the present invention;

FIG. 4 is an isometric view of the tire assembly prepared for retreading as it is inserted into a standard tire retreading mold;

FIG. 5 is an exploded cross-sectional view of the entire assembly and apparatus;

FIG. 6 is a partial cross-sectional view of a new and improved adjustable mold, as adapted for retreading of various sized tires;

FIG. 7 is a cross sectional view of a new and improved mold;

DETAILED DESCRIPTION OF THE DRAWINGS

Figure 1:
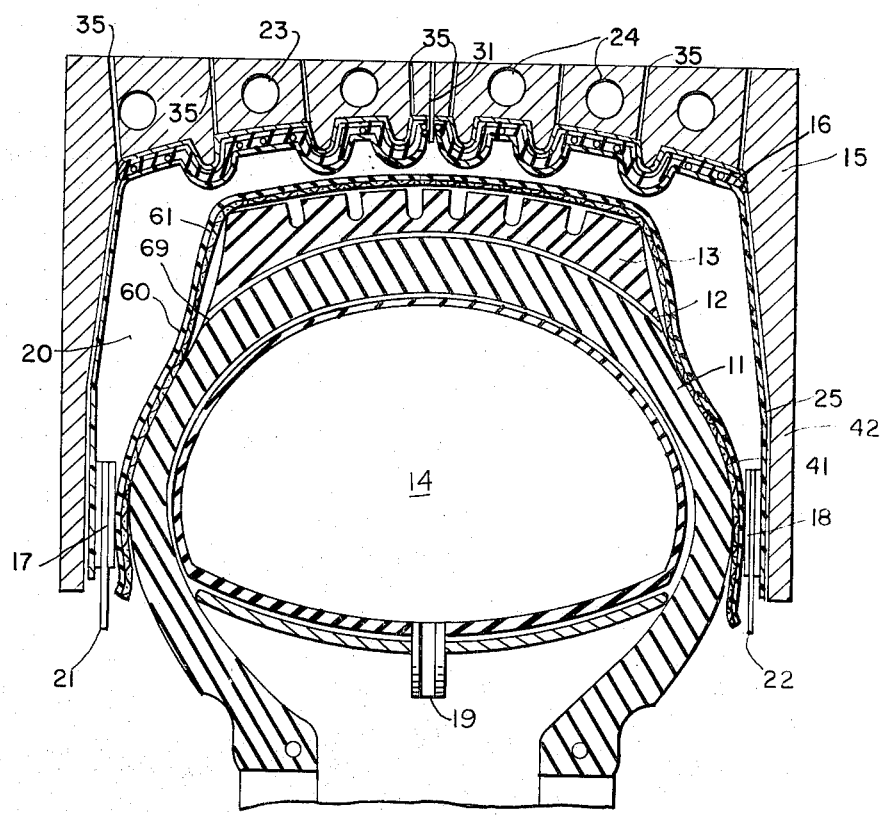
FIG. 1 is a partial cross section of a standard tire retreading mold, as fitted for use in retreading a tire with a precured and precast tread.

Referring to FIG. 1, a worn-out tire casing 11 has been prepared for retreading by buffing it on a buffing machine to remove any of the old tread design. The buffing not only cleans the surface of the casing but roughens it in preparation for the bonding and vulcanizing processes to follow. A liberal coating of a solvent or rubber cement is applied to the roughened casing. Another layer of solvent or rubber cement is applied to the under surface of the premolded and precured tread strip 13. The underside of this tread strip is also buffed or manufactured with a pre-roughened surface. The rubber cement or solvent is utilized to hold the tire assembly prepared for retreading together before it is placed in the tire retreading mold. A curing bag 14 is placed within the tire and partially inflated. The entire assembly is then enveloped with a nylon mesh air bleeding means 61, and an inner envelope 60. This assembly is then placed within a standard tire retreading mold 15 which has been lined with mold liner 16, and a seal is affected between the mold liner 16 and envelope 60 by means of gasket members 17 and 18.

Pressure is applied to the inside and outside of the tire casing by inflating the curing bag 14 with hot air or steam through nozzle 19. Simultaneously, air pressure or hydrostatic pressure is applied to the chamber 20 maintained between the tire prepared for retreading and the mold liner by means of valve member 21 and/or 22. Pressure in the curing bag and in chamber 20 may vary between 20 and 200 pounds per square inch. A lower pressure will extend the lifetime of the curing bag, envelope and mold liner, but it may cause the bad adhesion between the components of the tire prepared for retreading. The mold liner itself is suitable for maintaining a pressure of 200 pounds per square inch, and the curing bag 14 is normally maintained at a pressure higher than that maintained in chamber 20 by the standard inflation difference that is normally maintained in the tire. In one typical example, if the tire is designed to operate at 25 pounds of pressure in normal use, chamber 20 will be inflated to 75 pounds per square inch and the curing bag to approximately 100 pounds per square inch. Thus, there is an effective adhesion pressure of 75 pounds per square inch forcing the tread layer 13 towards carcass 11.

Figure 10:
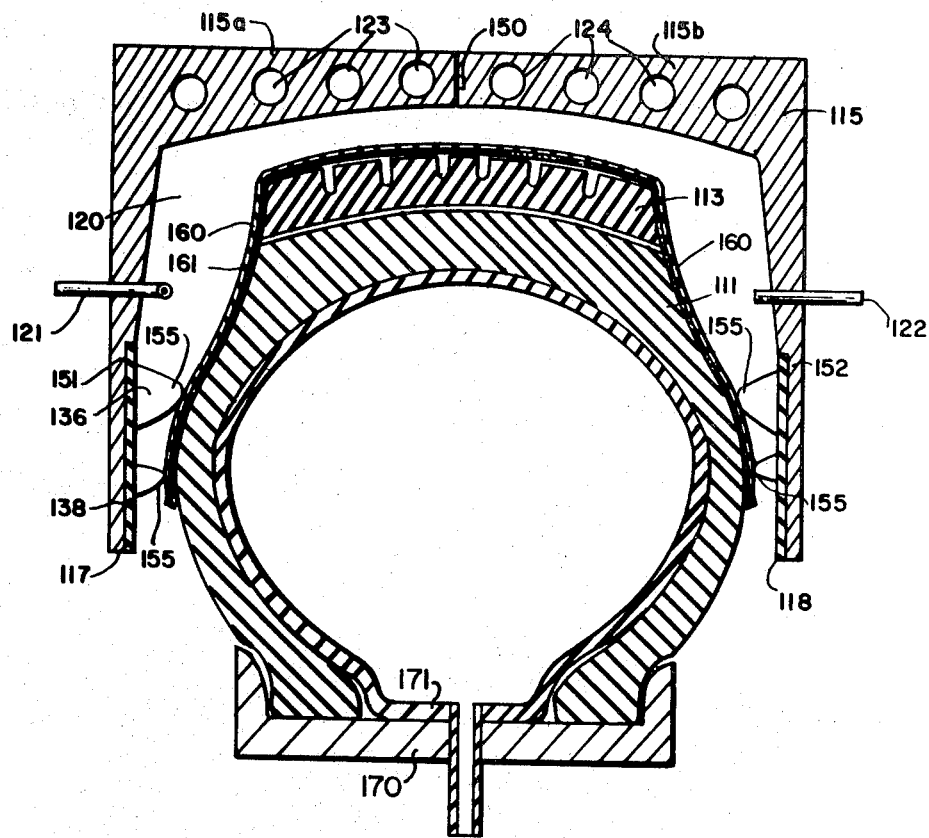
FIG. 10 is a cross sectional view of a retreading apparatus and a tire assembly prepared for retreading, wherein said assembly is mounted on a rim

Alternately, as illustrated in FIG. 10, the tire may be mounted on a rim 170 and inflated with a standard, inner tube 171 before it is placed in the mold. In this application, however, the air pressure utilized may be somewhat reduced.

The temperatures utilized typically range between 150°F. to 300°F., depending upon the technical properties of the used casing. Generally speaking, a high temperature makes for a short curing time but may impair the quality of the casing. A low temperature does not generally affect the tire casing itself but does unduly extend the curing time. The temperature is generated by supplying 300° pressurized air or steam to curing bag 14 through nozzel 19. High temperature at the exterior of the casing will result from circulating 300° air or steam in chamber 20 by introducing it through inlet 21 and exhausting it through inlet 22. Additionally, the heating apparatus in the standard tire retreading mold 15 may be utilized, and steam or hot air will be circulated through passages 23 and 24 or as in the case of an electric mold, the heating element of the standard tire retreading apparatus may be energized.

The tire retreading is finished when the uncured layer of rubber 12 is vulcanized and fully bonded to casing 11 and tread member 13. This vulcanization process completes the cure of tread member 13, if it is a partially cured tread, but in any event vulcanizes the tread, adhesion layer, and carcass into a unitary assembly.

Referring to FIG. 5, the mold liner consists of a plurality of layers. The first layer 25 extends over the tire assembly prepared for retreading from sidewall to sidewall to form an effective seal between the mold liner and the standard tire retreading mold. A second and third layer 26 and 27 are applied on top of the first layer to cover the tread molding area generally designated at 30 on mold 15. A fourth layer 28 is applied over the top of the two layers 26 and 27 to cover them and bond the four layers into a single mold assembly. Layers 25 and 28 are formed of a thin flexible non-thermoplastic material; whereas layers 26 and 27 are formed of relatively thick uncured layers of raw rubber. Short lengths of steel bands or cords 29 may be inserted between layers 26 and 27 to strengthen and provide some structured rigidity for the mold liner.

Figure 2:
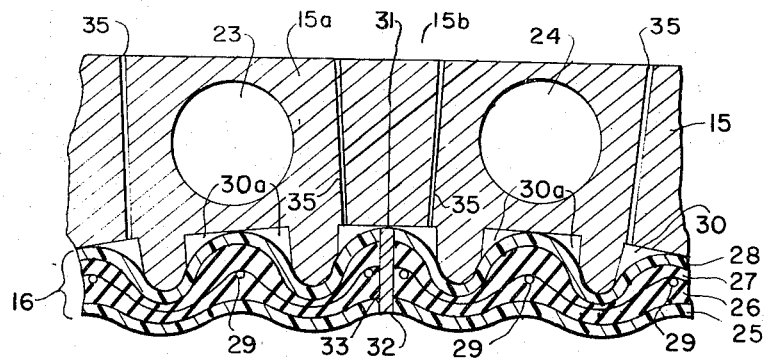
FIG. 2 is an enlarged partial cross section of a standard tire retreading mold, and the mold liner used therein.

It will be noted in FIG. 2 that the mold 15 is split into two sections 15a and 15b. Similarly, the mold liner 16 is split at 32 and gasket 33 is applied to one side of the mold liner. Layer 33 is a soft cured flexible layer that seals against the opposing section of the mold liner to prevent passage of any fluids therebetween.

There are two problems inherent in utilizing the mold liner which must be balanced against each other to achieve satisfactory operation. The first problem is transferring the heat that may be generated in mold 15 through the mold liner and into the interior chamber 20. The other problem is the reusability of the mold liner, and in providing for its ease of insertion. If a relatively hard layer were used adjacent the tread pattern 30, very little heat would be transferred because it would cover the actual tread channels and ridges that normally provide a much larger heat transfer surface. In such case, the only heat transfer would be across the general uppermost area of the tread pattern.

If a soft flexible material is utilized, the material will fill the tread pattern completely, filling the voids such as indicated as 30a and will be cured in that position by the temperature and pressure of the vulcanized process. Although the soft material will utilize all of the heat transfer surface, it then becomes extremely difficult to separate the mold liner from the mold casing 15, and almost impossible to reinsert the mold liner for further use. Therefore, the present multi-layered mold liner has been found to be an equitable balance to solve the two problems. Utilizing the relatively thick, soft uncured rubber layers 26 and 27, the rubber will migrate into the tread pattern 30 as illustrated in FIG. 2, thereby increasing the effective heat transfer surface of the mold liner. Using a relatively thin, non-thermal plastic layer 28 which is already cured, prevents the relatively soft layers 26 and 27 from migrating into void 30a, and enables the operator to remove the mold liner after the curing operation is completed, and to insert it for furture use with a minimum amount of effort. The inserted mold liner halves normally stay in the proper mold half if the operator retreads several tires in the same apparatus. They are removed only if mold is reutilized for conventional retreading.

The mold liner is necessary to effectively seal air passages 35 that are utilized in the standard retreading mold to allow the raw uncured rubber to migrate into the tread pattern 30.

Figure 8:
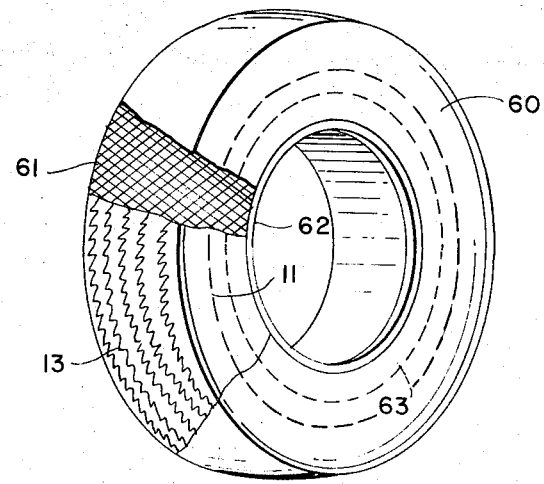
FIG. 8 is a layered, sectional, and isometric view of a tire assembly prepared for retreading, an air bleeding means, and the inner mold liner.

An interior envelope is shown in cross section in FIG. 8, draped about carcass 11 and thread cap 13. This interior envelope is placed about the tire assembly prepared for retreading before it is placed in the mold. Sandwiched between the tire assembly prepared for retreading and the envelope 60 is air bleeding means 61. This air bleeding means may be formed of a woven-mesh cloth such as a nylon mesh or the like and allows the air trapped between the tire assembly prepared for retreading and the inner envelope to migrate from the trapped cavities to the ambient air pressure at 62. Inasmuch as the gasket and sealing means generally contact the inner envelope at the dotted line illustrated at 63 the air bleeding means 61 effectively provides an air passageway from the cavity between the interior envelope and the tire assembly to the outside atmosphere. In this way, any air trapped in the tire assembly or between the tire assembly and the envelope liner is expelled when the pressure in chamber 20 is raised above the ambient atmospheric air pressure.

The purpose of the inner envelope 60 is two-fold. First, it enables the air pressure to be applied uniformly over the tread-capped surface throughout the curing process. If the tire were placed in the tire retreading assembly without the envelope, the air present between layers 11 and 13, when subjected to the heat, would expand causing the tread layer 13 to lift from the carcass. Once the tread cap lifts from the carcass, without the envelope, the air in chamber 20 at that pressure enters the joint between tire carcass 11 and tread cap 13 and provides equal pressure on both sides of tread cap 13, thereby assisting the natural resiliency of the tread cap and allowing it to become separated from the tire carcass. In this manner, the inner envelope 16 not only distributes pressure evenly from the cap to the carcass but also prevents any of the high pressure air present in chamber 20 from entering into the sealing region between the carcass 11 and tread cap 13 to thereby destroy the bond.

The second purpose of the interior envelope is to provide an effective escape route through the nylon mesh 61 for any air that is trapped in the seal between air carcass 11 and the tread member 13.

Referring again to FIG. 5, it will be noted that gasket members 17 and 18 illustrate an alternate construction from that illustrated in FIG. 1. The present invention enables the owner of a standard tire retreading apparatus illustrated as 15 to utilize the new premolded and precured tire tread in retreading tires. It also enables the operator to retread a variety of different sizes of tires by use of spacer members 36 and 37 illustrated on gaskets 17 and 18. Thus, an operator may adapt his mold to as many as four cross sectional sizes below the cross sectional size of the tire mold. The largest size tire that may be utilized with the mold liner would be one size below the mold size. A plurality of bead sizes may also be used, i.e., 6.50-14; 6.70-14; 7.00-14, so that in actuality if three cross sectional sizes and four bead sizes are used, the total number of combinations would be twelve. Spacer members 36 and 37 enable the operator to utilize a plurality of bead sizes by inserting the appropriately sized bead spacer as illustrated in FIG. 3. The gasket sealing means 17 comprises spacer member 36, annular support member 38, inlet means 21, exhaust means 39, and means for providing an air pressure reading of the interior chamber 40. In actuality, the functions of 21, 39 and 40 are interchangeable, with the inlet and exhaust being supplied to either and the pressure gauge being supplied to any one of the three. The end of inlet, pointing into chamber 20 may be provided with a jet, injecting air or steam in a tangential direction into chamber 20 for better circulation. This prevents any localized hot spots that might otherwise distort the carcass and result in an uneven cure. Alternately, only one such gasket means such as 17 need be used, as the tire sidewall 41 illustrated at FIG. 1 will form an effective seal between layer 25 and wall member 42 without the necessity of using gasket member 18.

When two gasket sealing members such as 17 and 18 are utilized, the inlets 21, 39 and 40 and gaskets member 17 will be used as supply, and the inlets generally designated as 22 in gasket member 18 will be used as exhaust, with one of the inlet members or exhaust members being utilized as a pressure reading station.

FIG. 4 is an isometric view of a tire assembly prepared for retreading about to be inserted into a standard tire retreading mold apparatus. Mold liner 16 is shown inserted in the illustrated mold half. The tread pattern 43 illustrated on flexible envelope 60 results from previous application of heat and pressure. The two halves of mold liner 16 are joined together along seam 32 as the other half of the tire retreading mold illustrated as 15b in FIG. 5 (not shown in FIG. 4) is closed and latched to tire mold apparatus 15a.

A new and improved form of the present invention is illustrated in FIGS. 6 and 7, wherein a treadless mold 115 is utilized with a single layer flexible envelope 160 to retread a tire carcass 111 with a premolded and precast tread member 113. It will be noted that the envelope 160 now forms chamber 120 between the mold 115 and envelope 160 rather than between envelope 160 and tire carcass 111. Gasket means 150 provides an effective seal for mold 115 between the respective halves 115a and 115b to provide an airtight chamber 120. Passageways 123 and 124 are for the circulation of hot air, steam or other type temperature fluids, or an an alternative embodiment, passageways 123 and 124 may be replaced with electric heating means. A curing bag 114 is utilized in this new and improved embodiment in the same manner in which it was utilized in a standard tire retreading apparatus. Alternatively, as illustrated in FIG. 10, a tire mounted on a rim with a conventional inner tube could be used in place of the curing bag. Gasket members 117 and 118 may be simplified somewhat in that air passageways 121 and 122 are now vented through the wall of chamber 115 rather than through the gasket members 117 and 118. Recesses 151 and 152 are provided in the interior wall of mold 115 through sealing gasket members 117 and 118.

It will be noted that FIG. 6 is a partial cross section of the new and improved mold of the present invention, whereas FIG. 7 is a full cross section. Removing the tread pattern or tread base from the interior of mold 115 has two primary advantages: first, it eliminates the somewhat complex mold liner required for use in the standard tire retreading mold and secondly, it allows an additional cross sectional size of tire to be used. In the apparatus disclosed in FIGS. 6 and 7 four cross sectional sizes may be used with a number of bead sizes whereas in a standard tire retreading mold, only three cross sectional sizes may be used. The number of bead sizes that may be adapted remain the same for each type of apparatus. In FIG. 7, it will be noted that mold 115 has access holes 153 and 154 to assist in the assertion of the circulating fluids to nozzle 119 or curing bag 114 and to assist the utilization of the standard mold loading equipment used to load and center the tire assembly prepared for retreading in the mold. In actual practice, and appropriately sized gasket and spacer 136 is utilized to adapt each of the vaious sized bead sizes to the mold liner.

The outer parts 155 of spacer 136 and the outer part 55 of spacer 36 in FIG. 5 form annular ridges to assist in providing an airtight seal between spacer 136 and envelope 160 or between spacer 36 and tire carcass 11. The pressure for sealing chamber 120 is provided by inflation of curing bag 114, pressing tire sidewall 111 and envelope 116 against spacer 136 as well as outer part 155. This forces the tire against portion 155 to effect an air tight seal.

Figure 9:
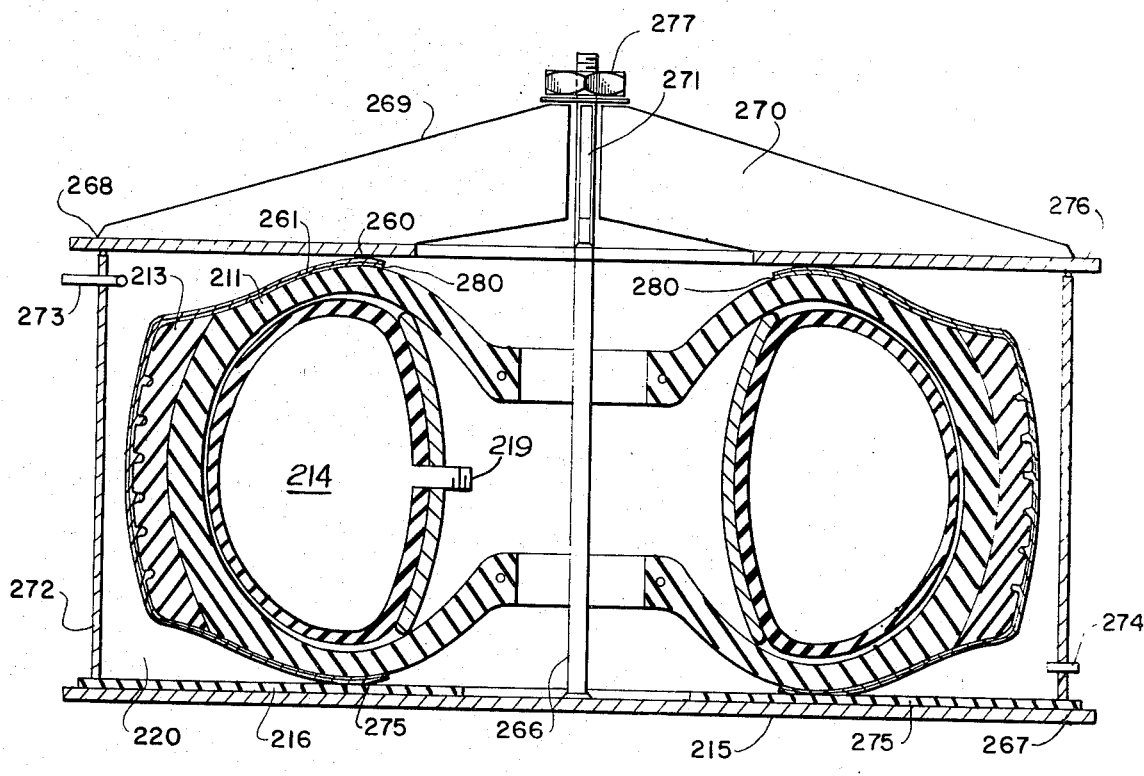
FIG. 9 is a cross-sectional view of a new and improved mold for retreading tires.

FIG. 9 illustrates another alternate and improved embodiment of my invention. It has been found that this embodiment is much easier, simpler and more inexpensive to manufacture than a standard retreading mold, and is readily adaptable to various sized tire carcasses. The base member 215 is a flat annular disk member provided with strengthening ribs (not shown) to adequately disperse the tensions between the central support 266 and the outer rim noted at 267. Another flat annular disk member 268 is provided with four (4) stiffening rims such as those illustrated at 269, 270 and 271. The third component of my new and improved tire retreading assembly is annular ring member 272 which is provided with air inlet means 273 and air outlet means 274. Chamber 220 is sealed by means of a flat annular gasket member 275 which seals not only the annular ring member 272, but also the tire side wall as shown at 216. An alternate sealing means is illustrated at 276 wherein an annular O-ring is provided in the outer extremity of ring member 272 to engage disk member 268 in a sealing arrangement.

With this embodiment, the operator may retread four or five tires of different cross sectional sizes with a single annular ring member 272. If on the other hand, the operator desires to retread a different cross-sectional size, such as 6.50 rather that 8.50, he needs only replace the annular ring member 272. In this manner it then becomes unnecessary to have more than one retreading apparatus. With my present invention, the only things needed to encompass an entire range of tire sizes are disk members 215 and 268 and a plurality of annular ring members 272 in different sizes.

It should be pointed out that sealing means 276 is an alternate form of the invention and may be utilized on both sides of ring member 272, or in the alternative, the annular gasket member 216 could be utilized on both support members, 215 and 268 to provide for effective gasket sealing on both sides for both the tire assembly prepared for retreading and the annular ring member 272.

Lug nut 277 is used to tighten the assembly and to provide effective sealing pressure against the seal gasket members 276 and 275 and thereby provide an airtight chamber 220.

In the operation of my device, lug nut 277 is removed and the upper disk portion 268 is removed. The tire assembly prepared for retreading, and its inner envelope 60 and air bleeding means 61 are placed into the tire assembly as shown in FIG. 9 and approximately centered therein. The upper disk portion 268 is then replaced and the entire assembly tightened with lug nut 277 to provide an effective air-tight seal in chamber 220. A source of high pressure, high temperature fluid such as steam is connected to fluid inlet 273 and 219 to provide an effective sealing differential pressure between chamber 220 and curing bag 214. It will be noted that air inlet 273 is angled in a circumferential direction, so as to cause the steam introduced into chamber 220 to circulate throughout the chamber in a circumferential direction before exiting at fluid exit 274. This prevents the steam inlet from focusing on any small portion of the tire assembly prepared for retreading and thereby prevents any uneven curing that might result therefrom. As pointed out previously, any air trapped between the tire carcass 211 and tread member 213 is effectively released by means of bleeding means 261 which is placed between inner envelope 260 and tire assembly 211. Inasmuch as the nylon mesh member 261 communicates with the ambient outside air pressure at 280, the differential pressure between chamber 220 and the outside air pressure will effectively drive any trapped air therein to the outside ambient air.

It is to be understood that, although several preferred embodiments of the invention have been shown in the drawings and described with considerable particularity in the foregoing specification, the invention is not limited to the specific details and forms shown and described, but includes all modifications coming within the scope of the invented claims and their equivalents.

I claim:

1. Apparatus for retreading tires with a precured premolded tread strip comprising
   a. a multipart rigid shell for holding a tire and precured tread assembly, said shell having a generally annular shape with a U-shaped cross section, said shell defining a sealed chamber above the tread of the assembly,
   b. a thin flexible envelope adapted to cover said assembly from sidewall to sidewall around its outer perimeter,
   c. sealing means on the inner wall of said shell adjacent each of said sidewalls for providing a seal between the flexible envelope and the annular shell at the sidewalls of the assembly, said sealing means cooperating with the inner walls of said multipart shell and the exterior surface of said envelope to provide a fluid tight seal for said chamber between said shell and said envelope,
   d. fluid inlet and exhaust means for providing pressurized and heated fluid within the annular chamber defined between said sheet and said envelope,
   e. inflatable means mounted for inflation within the interior of said assembly, said means inflated to a pressure greater than the pressure in said annular chamber, said means laterally distending the sidewalls of said assembly to contact said sealing means,
   f. means mounted between said assembly and said envelope for evacuating air trapped between the surface of the tire assembly prepared for retreading and said thin flexible envelope.

2. Apparatus for retreading tires comprising:
   a. a treadless, two-part torroidal mold having a generally U-shaped cross-section, said mold having a fluid inlet and a fluid exhaust means, said fluid inlet means being disposed tangentially within said mold to direct said fluid tangentially of said tire in a swirling circular manner,
   b. a thin flexible envelope mounted within said mold for covering a tire assembly prepared for retreading from sidewall to sidewall around its outer perimeter;
   c. sealing means for sealing each side of said flexible envelope to said torroidal mold along the sidewall of a tire assembly prepared for retreading to thereby create an annular chamber between said liner and said mold, said sealing means defining two annular members interfitted with said two part torroidal mold, one of said members being interfitted on each side of said tire;
   d. curing bag means for mounting within said tire assembly, said curing bag means defining at least one inlet means for inflating the interior of said tire assembly to a pressure equal to or greater than the pressure in said annular chamber, said curing bag contacting the inner surface of said tire assembly from a point on the inner sidewall opposite one of said sealing means to a point on the other side of said inner sidewall opposite the other of said sealing means, said curing bag also defining a lateral member extending laterally within said tire from a point opposite one of said sealing means to a point opposite said other sealing means.

3. Tire retreading apparatus as claimed in claim 2 wherein said sealing means further comprise an annular support member, and an annular spacing portion to space the sealing portion of said gasket means axially from the annular support member of the gasket.

4. Tire retreading apparatus as claimed in claim 2 which further comprises an air bleeding means mounted between said thin flexible envelope and said tire assembly prepared fro retreading.

5. Apparatus for retreading tires as claimed in claim 1 wherein said inflatable means defines a curing bag means with at least one fluid inlet means for inflating said curing bag means to a pressure greater than the pressure in said annular chamber.

6. Apparatus for retreading tires as claimed in claim 1 wherein said inflatable means comprises a rigid rim for supporting the tire and an inner tube inside the tire and around the rim with an inlet means for inflating said tube to a pressure greater than the pressure in said annular chamber.

7. Apparatus for retreading tires as claimed in claim 1 wherein said means for sealing the flexible envelope comprises annular sealing means mounted on the inner sidewalls of said annular mold.

8. Apparatus for retreading tires as claimed in claim 5 wherein said curing bag means provides support for the inner surface of said tire assembly from a point radially aligned with or radially inwardly from said sealing means on one inner sidewall of said mold to a point on the other inner sidewall of said mold opposite the other of said sealing means.

9. Apparatus for retreading tires as claimed in claim 9 wherein said sealing means comprises annular undulations which extend inwardly to contact the tire assembly prepared for retreading.

10. Apparatus for retreading tires as claimed in claim 8 wherein said means for inflating the interior of said tire assembly further comprises a lateral means to support said curing bag means, said lateral means extending laterally within said tire from a point opposite or radially inwardly of one of said sealing means to a point opposite said other sealing means.

11. Apparatus for retreading tires as claimed in claim 1 wherein said multi-part mold defines first and second sidewalls and first and second annular connecting members, said connecting members joining together midway between said sidewalls to form said annular mold.

12. Apparatus for retreading tires as claimed in claim 1 wherein said sealing means comprise at least one annular ridge which extends inwardly to contact the tire assembly prepared for retreading.

13. Apparatus for retreading tires with a precured premolded tread strip comprising
   a. a treadless, two part rigid toroidal enclosure having a generally U-shaped cross section and defining a generally annular sealed chamber around the tread of the assembly,
   b. a thin flexible envelope adapted to cover said assembly from sidewall to sidewall around its outer perimeter,
   c. sealing means defined on the inner wall of said enclosure adjacent each of said assembly sidewalls, said sealing means defining at least one annular ridge adjacent each of said sidewalls for providing a seal between the flexible envelope and the enclosure at the sidewalls of the assembly, said ridges, and the inner walls of said enclosure cooperating with the exterior surface of said envelope to provide a fluid tight annular chamber around the tread of the assembly,
   d. fluid inlet and exhaust means for admitting pressurized and heated fluid into said annular chamber defined between said enclosure and said envelope,
   e. inflatable means mounted within said assembly for inflation to a pressure greater than the pressure in said annular chamber, said means laterally distending the sidewalls of said assembly to urge them into contact with said sealing ridges,
   f. means mounted between said assembly and said envelope for evacuating air trapped between the surface of the tire assembly prepared for retreading and said thin flexible envelope.

14. Apparatus for retreading tires as claimed in claim 13 wherein said inflatable means comprises a rigid rim for supporting said tire assembly and an inner tube within said assembly, said tube having an inlet means to provide inflation of said tube to a pressure greater than the pressure in said annular chamber.

15. Apparatus for retreading tires as claimed in claim 13 wherein said inflatable means comprises a curing bag means with at least one fluid inlet for inflating said curing bag means to a pressure greater than the pressure in said annular chamber.

16. Apparatus for retreading tires as claimed in claim 13 wherein said sealing means also comprises axial spacing means for laterally adjusting the ridges defined on said sealing means.

* * * * *